June 30, 1964 L. I. GOLDFISCHER ETAL 3,139,618

DOPPLER FREQUENCY TRACKER

Filed Sept. 5, 1962 5 Sheets-Sheet 1

*INVENTORS*
LESTER I. GOLDFISCHER
SIDNEY K. BENJAMIN
RALPH M. PINCUS
*BY* [signature]
ATTORNEY.

*INVENTOR.*
LESTER I. GOLDFISCHER
SIDNEY K. BENJAMIN
RALPH M. PINCUS
*BY*
H. A. Mackey
ATTORNEY.

June 30, 1964 L. I. GOLDFISCHER ETAL 3,139,618
DOPPLER FREQUENCY TRACKER
Filed Sept. 5, 1962 5 Sheets-Sheet 3

INVENTOR.
LESTER I. GOLDFISCHER
SIDNEY K. BENJAMIN
RALPH M. PINCUS
BY H. S. Mackey
ATTORNEY.

INVENTOR.
LESTER I. GOLDFISCHER
SIDNEY K. BENJAMIN
RALPH M. PINCUS
BY
H. S. Mackey
ATTORNEY.

INVENTOR.
LESTER I. GOLDFISCHER
SIDNEY K. BENJAMIN
RALPH M. PINCUS
BY
A. A. Machen
ATTORNEY.

United States Patent Office 3,139,618

Patented June 30, 1964

3,139,618

DOPPLER FREQUENCY TRACKER

Lester I. Goldfischer and Sidney K. Benjamin, New Rochelle, and Ralph M. Pincus, New York, N.Y., assignors to General Precision, Inc., a corporation of Delaware Filed Sept. 5, 1962, Ser. No. 221,484
12 Claims. (Cl. 343—9)

This invention relates generally to Doppler radio navigation devices for determining the ground speed, drift angle and vertical attitude of an aircraft and more particularly to a novel frequency tracker suitable for use in a Doppler radio navigation device.

The novel frequency tracker disclosed in this application is particularly suitable for use in a Doppler system such as that disclosed in patent application Serial No. 718,376 filed February 28, 1958 by Lester I. Goldfischer.

The subject frequency tracker may be directly substituted for the frequency tracker shown in FIGURE 4 of patent application, Serial No. 718,376 and will when thus substituted provide superior system performance for a number of reasons which will be set forth in detail later.

The frequency tracker disclosed is specifically designed to operate in a Doppler navigation system in which the antenna is stablized to the aircraft velocity vector rather than the horizontal projection of the vector parallel to the aircraft's ground track; and in addition to a Doppler system which utilizes an antenna radiating paired dual multiple beams as does the antenna disclosed in the above said patent application, Serial No. 718,376.

One object of this invention is to provide a frequency tracker for use in a paired dual multiple beam Doppler navigation system which requires simple filters only that need not track with each other.

Another object is to provide a frequency tracker as set forth above which is reliable in operation, accurate, and easily and inexpensively manufactured.

The foregoing and other objects and advantages of the invention will become more apparent from a consideration of the drawings and specification wherein one embodiment of the invention is shown and described for illustration purposes only.

Figure 1:
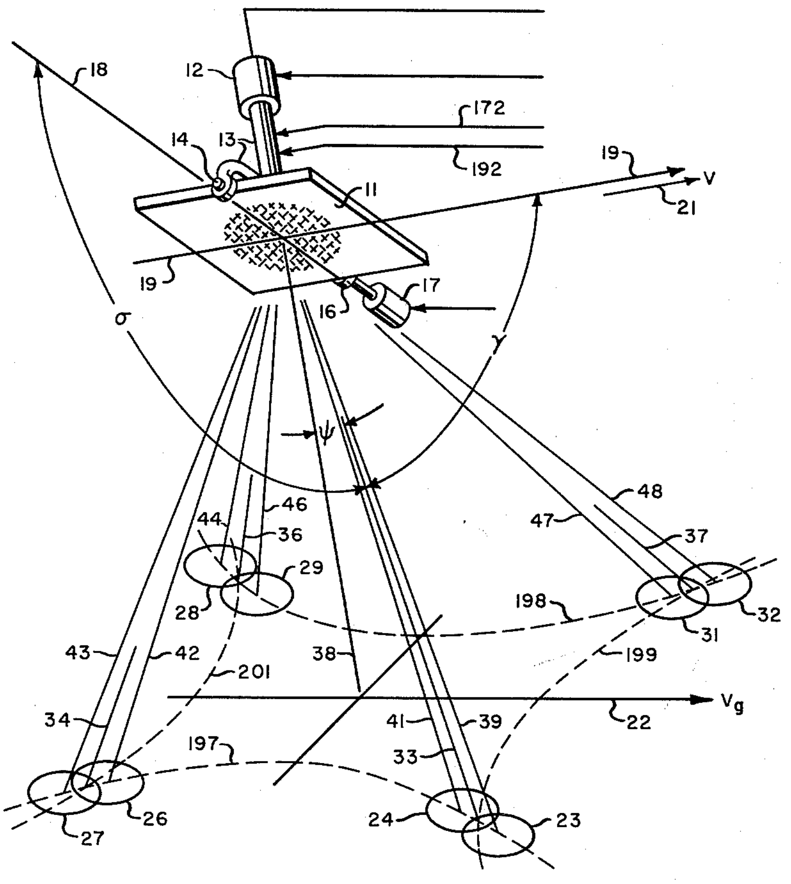
FIGURE 1 is an isometric drawing of an antenna and the beam pattern radiated.

In FIGURE 1 a planar array antenna 11 is rotatably supported, about an axis 18, on two pivot points 14 and 16 located on a forked member 13. Forked member 13 and the array 11 are both supported by a motor 12 which is mounted on an outer deck plane, not shown. A motor 17 is drivingly connected to array 11 for controlling rotation of the array about axis 18. The fore-and-aft or major axis 19 of antenna array 11 is illustrated pointing in the direction of the aircraft's velocity vector 21 which has a magnitude V.

The aircraft velocity vector, as shown in the drawing, includes a small climb angle; however, the angle of climb permissible is limited only by the fact that the radiated beam must point toward the earth so that the reflected and Doppler-shifted return will be received by the antenna array. Line 22 represents the ground track of the aircraft and has a magnitude $V_g$. This line is a projection of the velocity vector V on the ground and is therefore equal to the aircraft ground velocity. The angle vector $V_g$ makes with the aircraft axis is equal to the drift angle.

Thus, when the antenna major axis 19 is aligned with the velocity vector V and the ground track vector $V_g$, the drift angle equals the angular displacement of the major axis 19 from the axis of the aircraft which may be determined from the deck plane previously referred to.

Antenna array 11 emits four dual microwave beams each of which includes two intersecting lobes. The eight lobes are arranged to irradiate the earth in a pattern indicated by circles 23, 24, 26, 27, 28, 29, 31 and 32. Four lines 33, 34, 36 and 37 extending from the antenna to the intersections of each pair of circles are representative of the four beam pairs and are used to illustrate the angles $\gamma$ (gamma), $\sigma$ (sigma), and $\psi$ (psi). The $\gamma$ (gamma) angle of each beam lies between major axis 19 and the beam, the $\sigma$ (sigma) angle between the beam and transverse axis 18, and the $\psi$ (psi) angle between the beam and a line 38 which is perpendicular to array 11.

Lines 39, 41, 42, 43, 44, 46, 47 and 48 extend from array 11 to the center of circles 23, 24, 26, 27, 28, 29, 31 and 32, respectively, and represent the eight lobes radiated by antenna array 11.

The lobes are radiated in pairs and the pairs are alternated at two different rates in sequence. Fore lobe 39 and aft lobe 42 are alternated with fore lobe 41 and aft lobe 43 at a lobing frequency of 45 cycles per second. The lobing frequency is not critical and can vary substantially. After 3 cycles the radiation is switched to the left side. Lobe 48 and 46 are simultaneously radiated as one pair and are alternated at the 45 cycle rate with lobes 47 and 44 which comprise a second pair. Here also, 3 cycles are radiated and then radiation is switched back to the right side as previously described. The right-left switch is continued at the 7½ cycle rate during operation.

Figure 2:
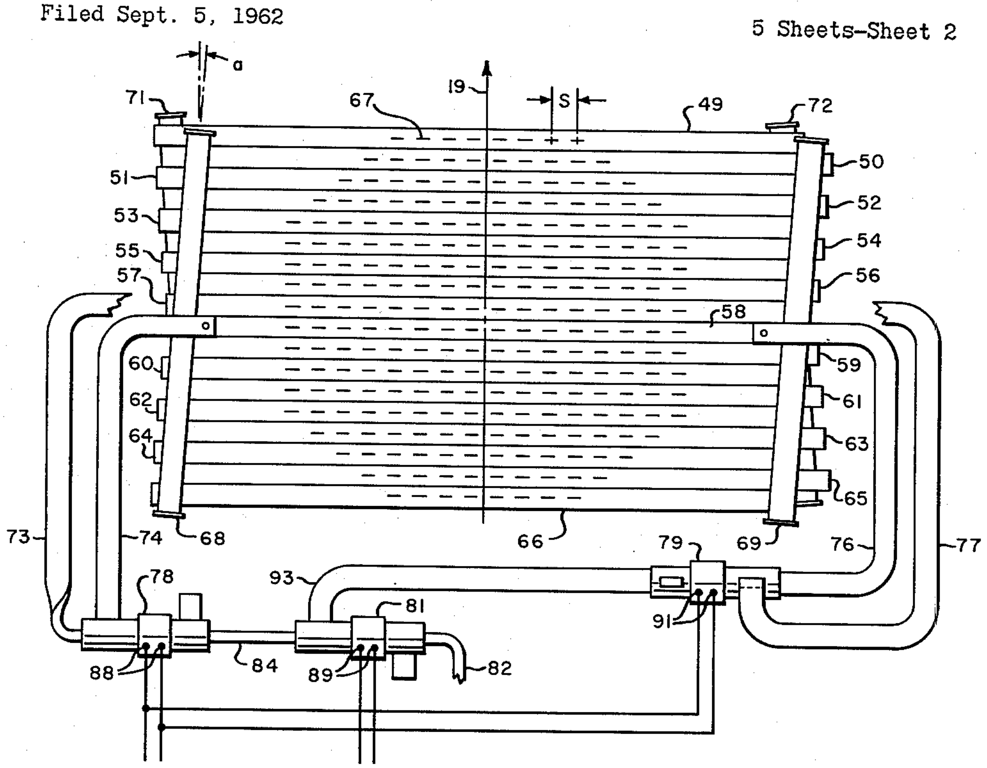
FIGURE 2 is a plan view of the antenna with the support structure removed.

The constructional details of antenna 11 and the switches for alternating the beams are shown in detail in FIGURE 2. In the figure a plurality of linear arrays, 49 to 66, inclusive, are arranged parallel with broad sides planar. Radiators such as broad side shunt slot 67 are arranged to cover an area which is generally circular as shown. Linear arrays 49 to 66 are each closed at both ends by tapered metal plugs, not shown, and the opposite ends of arrays 50, 52, 54, 56, 58, 60, 62, 64 and 66 are connected to feed waveguides 68 and 69, respectively, while the opposite ends of the remaining arrays are connected to feed waveguides 71 and 72, respectively, located on the back side of the arrays. The ends of each of the four feed waveguides are terminated in a plug and they are each center feed. Connecting wave guides 73, 74, 76 and 77 feed guides 71, 68, 69 and 72, respectively.

The linear arrays with the exception of the number of slots are identical and the spacing between slots S, is selected so that the microwave energy supplied to successive slots differs in pase by $\pi/2$ radians. In addition the radiator couplings are all of the same sense and magnitude to provide inphase resonant arrays with exponential illumination.

In place of shunt slots any other type of radiator may be used. However, those type which provide circular polarization are advantageous since they afford a large measure of immunity from raindrop scatter. Each of the four feed waveguides is positioned about 3½ degrees from the normal to the linear arrays. Guides 68 and 69 are slanted in one direction while guides 71 and 72 are slanted in the opposite; thus, slight feed phase differences are introduced which causes the splitting of each beam into two space separated lobes.

Connecting waveguides 73, 74, 76 and 77 are each connected at one end by means of matched transistors to feed waveguides 71, 68, 69 and 72, respectively. Connecting waveguides 73 and 74 are connected at their other ends to ferrite switch 78 and connecting waveguides 76 and 77 are connected to ferrite switch 79. Switches 78 and 79 are connected to a third ferrite switch 81 which is connected by a rectangular guide terminal 82 to a conventional receiver-transmitter, not shown in this figure.

Ferrite switches 78, 79 and 81 each have a pair of direct current terminals 88, 91 and 89, respectively. Terminals 88 and 91 are connected in parallel to a clock generator, not shown in this figure, which supplies a square wave at the aforesaid lobing frequency of 45 c.p.s. and terminals 89 are connected to the clock generator and receive a square wave at the right-left frequency of 7½ c.p.s. Thus, the lobe patterns previously described are obtained by operating switches 78, 79 and 81 at the above frequencies since lobing is controlled by switches 78 and 79 while left-right radiation by switch 81. Waveguides 84 and 93 provide communication for the microwave energy between switch 81 and switches 78 and 79, respectively.

Figure 3:
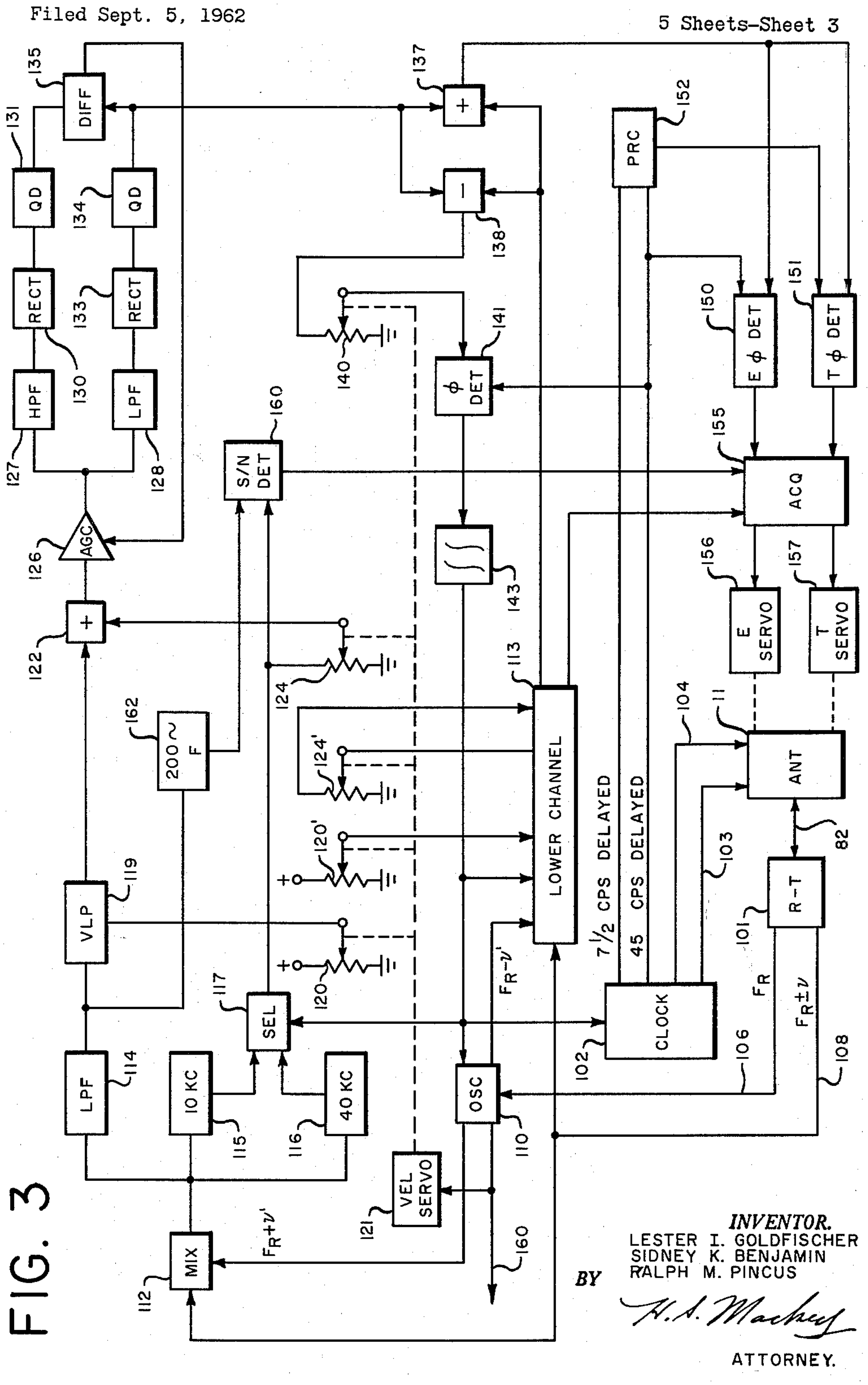
FIGURE 3 is a block diagram of a complete Doppler system with the frequency tracker shown in detail; and, FIGURES (4–11) are graphs for illustrating the operation of the system.

FIGURE 3 is a block diagram of a complete system including the novel frequency tracker which is shown in detail. A receiver-transmitter 101, similar to the receiver-transmitter shown in FIGURE 3 of the above said application by Lester I. Goldfischer, supplies a reference microwave frequency $F_R$ via element 82 to the antenna 11. The energy is radiated as described above and a clock generator 102 supplies antenna 11 with two square wave voltages at 45 and 7½ c.p.s. via conductors 103 and 104 for performing the switching functions previously described. The receiver-transmitter in addition supplies on conductor 106 the reference frequency $F_R$.

The reference frequency supplied to antenna 11 is radiated by the antenna and the reflected or back-scattered energy recaptured by the antenna is processed by the receiver portion of unit 101 which supplies an output on conductor 108 which is indicative of aircraft velocity, elevation and train. The graphs shown in FIGURES 4–8, inclusive, illustrate the output on conductor 108 for various conditions of aircraft operation and will be described in detail before proceeding with the circuit description.

Figure 4:
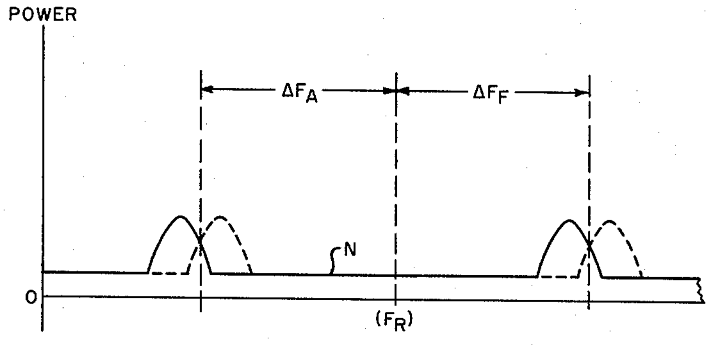

FIGURE 4 is a graphical representation of the output on conductor 108 when the antenna 11 is aligned with the velocity vector of the aircraft and when the magnitude of the velocity vector is proportional to a reference frequency generated by an internal local oscillator, not yet described. The dotted portion of the curve and the corresponding solid portions are alternately present and interchange at the lobing frequency of 45 c.p.s. For the conditions set forth above the left and right beam pairs provide substantially identical outputs; therefore, only one set of curves is shown for the above said operating conditions.

In all of the curves shown the two lower frequency signals are supplied by the aft lobes which are switched at the 45 c.p.s. lobing frequency and therefore the signals also switch at the said lobing frequency. The two higher frequency signals are supplied by the fore lobes and are also switched at the said lobing frequency. The signals are shifted from the reference frequency $F_R$ by an amount which is, in the case depicted in FIGURE 4, proportional to the magnitude of the velocity vector. The downward shift $\Delta F_A$ and the upward shift $\Delta F_F$ are equal and opposite.

Figure 5:
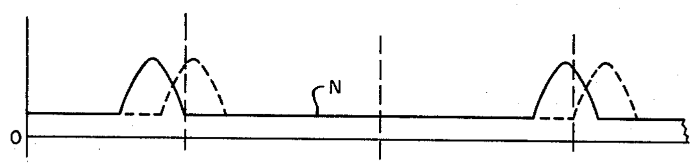

FIGURE 5 shows the effect of an increase in velocity on the received signal. The $\Delta F$ shown in FIGURE 4, which is the displacement of the adjacent half power points of the signals from the reference frequency $F_R$, is increased. If the aircraft velocity had decreased, the $\Delta F$ would have diminished.

Figure 6:
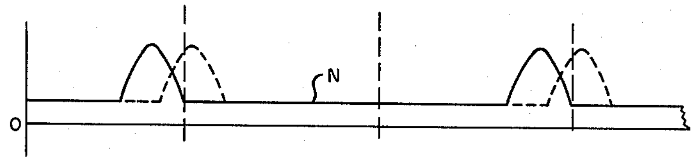

The graph shown in FIGURE 6 illustartes the effect on the signal supplied by unit 101 of a change in elevation only. That is a change in the alignment of the elevation plane of the antenna with respect to the actual elevation of the velocity vector of the aircraft. Such a change causes a displacement of the lower signal from the aft beam and of the upper signal from the fore beam in the same direction. The direction of the displacement will be reversed if the misalignment of the antenna and the vector is reversed. However, the left and right signals will be substantially similar and therefore only one curve is shown.

Figure 7:
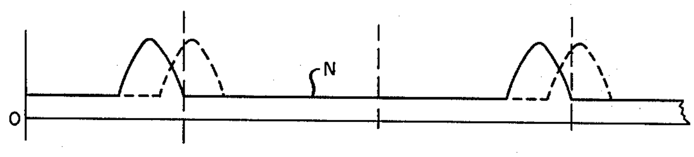
Figure 8:
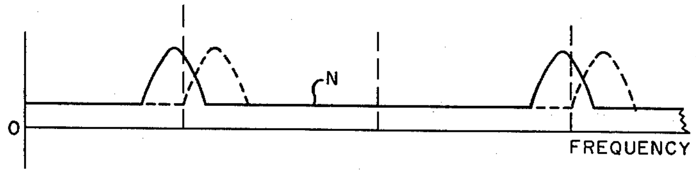

FIGURES 7 and 8 illustrate the signals received from the left and right beams, respectively, for a change in train only. That is, a change in the alignment of the train axis of the antenna with respect to the actual velocity vector of the aircraft. This change is similar to that produced by an elevation misalignment described above. However, the left and right side displacements are opposite. If the direction of the misalignment is reversed the curves shown in FIGURES 7 and 8 are also reversed. The fact that the displacement with respect to the left and right beams differs for a train axis misalignment provides the means by which an elevation misalignment can be distinguished from a train misalignment in the frequency tracker portion of the system. In each of the graphs the useable signal is superposed on a broadband of noise indicated in each of the graphs by "N."

The frequency tracker has an upper and a lower channel. The upper channel is shown in detail while the lower is shown only as a single block since they are structurally identical. They do, however, operate on the input signal differently. The difference in operation is achieved solely by the keying frequency supplied to the channels.

An oscillator 110, which may be similar to the oscillator disclosed in application Serial No. 718,376, supplies an output with a frequency $F_R+V^1$ for keying the upper channel and another output with a frequency $F_R-V^1$ for keying the lower channel. The actual value of the frequencies $F_R+V^1$ and $F_R-V^1$ is determined by a D.C. potential proportional to the magnitude of the aircraft velocity vector and its generation will be described in detail later. The keying frequency $F_R+V^1$ is supplied to an upper channel mixer 112 while keying frequency $F_R-V^1$ is supplied to a lower channel mixer not shown but included in the lower channel circuit 113. The other input of mixer 112 and its counterpart in the lower channel are connected to receiver-transmitter unit 101 by conductor 108.

The output of mixer 112 is applied in parallel to a low pass filter 114, a 10-kilocycle filter 115 and a 40-kilocycle filter 116. Filters 115 and 116 each have their outputs connected to a selector switch 117 which is operated by a D.C. voltage proportional to aircraft velocity. Thus, at low aircraft velocities the output from the 40 kc. filter 116 is permitted to pass through switch 117 and at high aircraft velocities the output from the 10 kc. filter 115 is passed through the switch. The two filters are necessary to ensure that noise only and no signal will be passed through switch 117; thus, only a sample of the noise on which no signal is superimposed is available at the output of switch 117. Switch 117 is preferably constructed of solid state components controlled by the D.C. voltage proportional to aircraft velocity; however, other types of switches may be employed. The source of the D.C. voltage will be described later in connection with the description of this figure.

The output of low pass filter 114 contains both the signal and the noise on which it is superimposed. This output is passed through a variable low pass filter 119 which has its cutoff frequency controlled by a potentiometer 120, the wiper of which is controlled as a function of aircraft velocity by a velocity servo system 121. Velocity servo system 121 provides a shaft position corresponding to the aircraft velocity. The control of this servo will be described later. Controlling the cutoff frequency of filter 119 as a function of aircraft velocity limits the output from mixer 112 to a narrow strip around the crossover point of the lobe switched signal shown in FIGURE 4. Thus, the power output of filter 119 will vary at the lobe switching rate if the frequency of oscillator 110 and the said crossover point fail to coincide and the phase of the variation will be determined by the direction of the displacement of the oscillator frequency $F_R+V^1$ from the said crossover point.

The output from filter 119 which includes both signal and noise is applied to a summing circuit 122 where it is added to a portion of the output from selector switch 117 which contains noise only. A potentiometer 124 which is controlled by velocity servo 121 attenuates the signal from selector switch 117 as a function of velocity to provide the correct proportion of noise signal at summing circuit 122.

The output of summing circuit 122 is connected to the input of a gain control amplifier 126 which has its output connected in parallel to a high pass filter 127 and a low pass filter 128. High pass filter 127 passes only noise which is rectified in a rectifier 130 and detected in a quadratic detector 131. Low pass filter 128 passes both signal and noise which is rectified in a rectifier 133 and detected in a quadratic detector 134. The outputs of quadratic detectors 131 and 134 are applied to a difference amplifier 135 which supplies an output proportional to signal strength. This output is fed back to amplifier 126 to control the gain of the amplifier so that the amplitude of the output of quadratic detector 134 is held constant.

The output of quadratic detector 134 and of its counterpart in lower channel 113 are applied to sum and difference amplifiers 137 and 138, respectively. The output of quadratic detector 134 and its counterpart in lower channel 113 are graphically illustrated in FIGURES 9–11, inclusive, curves (*a* and *b*), respectively. In order to simplify the explanation, each of the possible error signals have been illustrated on the assumption that no error exists in the other flight parameters.

Figure 9:
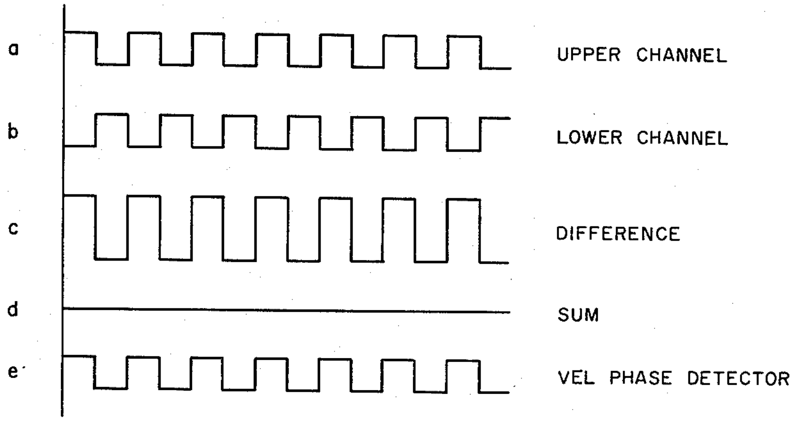

Thus, in FIGURE 9 only a velocity error exists. A velocity error will exist when the frequency $(F_R+V^1)$ supplied by oscillator 110 to mixer 112 is not equal in frequency to $(F_R+V)$ from receiver-transmitter 101 and when $(F_R-V^1)$ from the said oscillator is not equal to $(F_R-V)$ from the receiver-transmitter 101.

Figure 10:
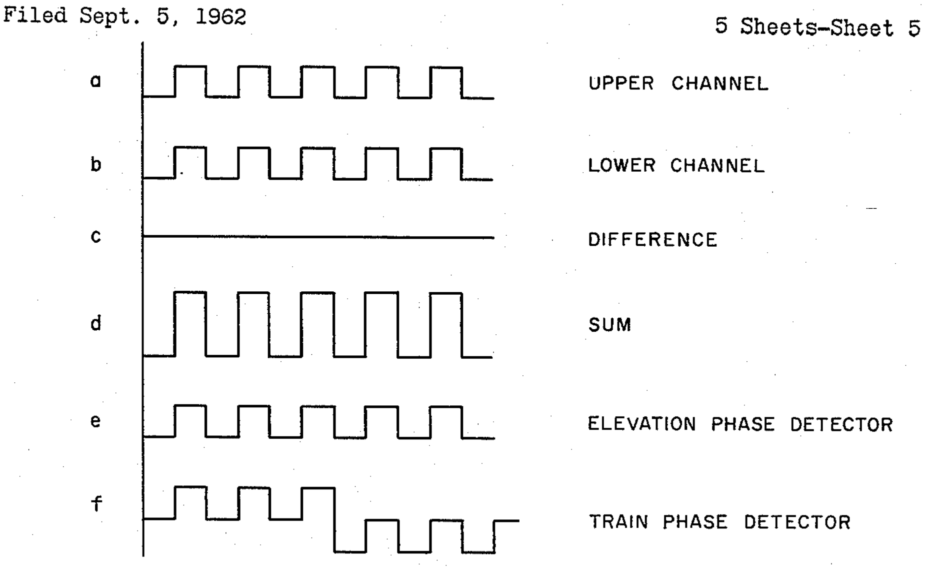
Figure 11:
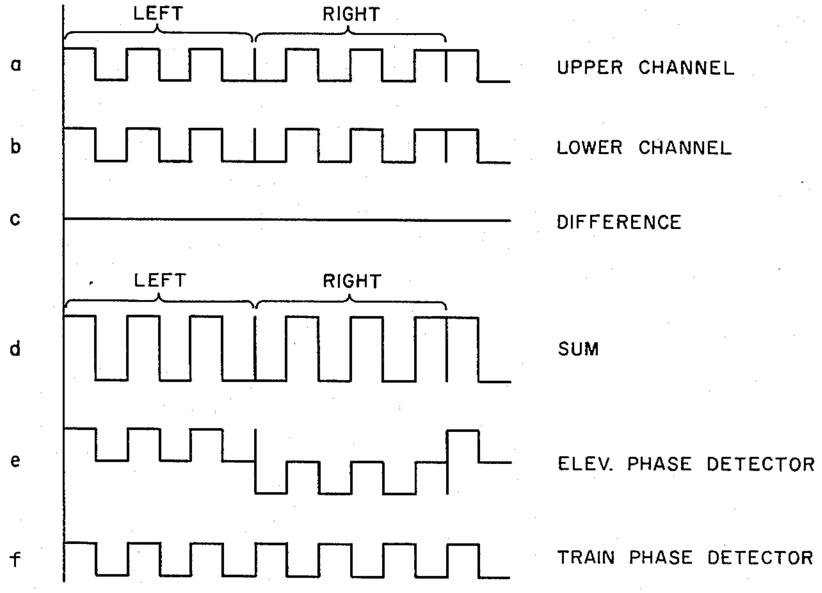

FIGURE 10 illustrates the case in which an elevation error only exists. An elevation error exists when the axis 19 of the antenna array is not aligned with or parallel to the aircraft velocity vector 21 in a vertical plane; and FIGURE 11 illustrates the case in which a train error only exists. A train error exists when axis 19 of the antenna array is not aligned with or parallel to the aircraft velocity vector 21 in a horizontal plane through the said vector.

Curves *a* and *b* in FIGURE 9 are identical in frequency waveform, and amplitude. However, they are 180° out of phase with each other. Curves *a* and *b* of FIGURE 10 are identical in all respects and curves *a* and *b* of FIGURE 11 while identical to each other differ from the *a* and *b* curves of FIGURE 10 since they are phase-reversed at the 7½ cycle left-right switching rate. If errors in velocity, elevation and train occur simultaneously, a composite error signal is available which may be resolved into its different components.

Difference amplifier 138 and sum amplifier 137 separate the velocity error signal, as shown by curves *a* and *b*, FIGURE 9, from the composite error signal since the difference of curves *a* and *b* of both FIGURES 10 and 11 is a D.C. level or a zero voltage if desired, see curve *c*, FIGURES 10 and 11. However, the difference of curves *a* and *b* of FIGURE 9 is a 45 c.p.s. square wave having approximately twice the amplitude of curves *a* and *b*, see curve *c*, FIGURE 9.

This 45 c.p.s. velocity error signal is attenuated in a potentiometer 140 which is controlled by velocity servo 121 and then applied to phase detector 141 which receives a delayed 45 c.p.s. reference voltage from clock generator 102. It is necessary to delay the 45 c.p.s. reference voltage to compensate for delays introduced in the upper and lower channels. The delay is proportional to velocity and is controlled by the same D.C. signal proportional to velocity that controls oscillator 110. A delay proportional to velocity is utilized since the frequency of the signal through the major portion of both channels is proportional to velocity and the delays introduced in the circuit components are proportional to frequency; therefore, the velocity component provides a suitable control for adjusting the time delay.

The output of phase detector 141 is shown graphically in curve *e*, FIGURE 9. This output is applied to a double integrator circuit 143 which supplies a direct current proportional to aircraft velocity. This output is the direct current referred to previously which controls both the frequency of oscillator 110 and the delay provided by clock generator 102.

Oscillator 110 in addition to the frequencies previously described supplies an alternating output $V^1$ on a conductor 160 which has a frequency proportional to the aircraft velocity. This output in addition to providing an indication of aircraft velocity, when connected to an appropriate indicator, controls velocity servo system 121 previously described.

Potentiometers 120' and 124' both controlled by velocity servo 121 operate in conjunction with the lower channel 113 and perform for the lower channel the same function that potentiometers 120 and 124, respectively, perform for the upper channel. Thus, potentiometer 120' controls the counterpart of variable low pass filter 119 in the lower channel, and potentiometer 124' attenuates the noise output of the counterpart of selector switch 117 in the lower channel.

The output of sum amplifier 137 is shown graphically by curves *d* in FIGURES 9–11 for each of the operating conditions set forth. For the velocity error, FIGURE 9, a D.C. voltage is provided which has no effect; for the elevation error, FIGURE 10, a 45 c.p.s. square wave of constant phase; and for a train error, FIGURE 11, a 45 c.p.s. square wave phase reversed at the 7½ c.p.s. left-right switching rate. Here again if all of the errors are simultaneously present a composite waveform is produced. However, the circuits following the sum amplifier output, which will now be described, separate the composite signal to derive separate elevation and train error signals which are utilized to correct the antenna position so as to align its axis vertically and horizontally with the aircraft velocity vector.

The output of sum amplifier 137 is applied in parallel to an elevation phase detector 150 and train phase detector 151. The elevation phase detector 150 receives the delayed 45 c.p.s. reference voltage from clock generator 102 and provides the output shown by curve *e* of FIGURE 10. The 45 c.p.s. delayed-reference voltage is phase reversed at a 7½ c.p.s. rate by a phase reversal circuit 152 and applied to the train phase detector 151. The output of the train phase detector for an elevation error only is shown in curve *f* of FIGURE 10 which has an average output equal to zero.

The output of sum amplifier 137 for a train error only is illustrated by curve *d* of FIGURE 11. The phase reversal at the 7½ c.p.s. rate is the result of the left-right switching. Because of this phase reversal the elevation phase detector output for a train error has an average equal to zero, see curve *e*, FIGURE 11. However, since the train phase detector reference voltage is phase reversed at the 7½ c.p.s. left-right switching rate, the train phase detector provides an error signal as shown by curve *f*, FIGURE 11. If the elevation or train error is opposite to that illustrated, the phase of the signals from the quadratic detectors is reversed which reverses the polarity of the phase detector outputs which permits bidirectional control of the antenna 11.

The outputs from elevation phase detector 150 and train phase detector 151 are applied through an acquisition circuit 155 to an elevation servo 156 and a train servo 157, respectively. Servo 156 includes motor 17, FIGURE 1, and actuates antenna 11 about its vertical axis to correct for errors in train. As the corrections are made the error signals are reduced to zero. Appropriate rate feedbacks and other commonly used expedients may be utilized to prevent system hunting and oscillations. However, none of these devices are disclosed here since they are well known in the servo mechanism art and do not constitute a part of this invention.

Acquisition circuit 155 acts as a switch responsive to the signal-to-noise ratio and permits passage of the phase detector outputs to their respective servos whenever the signal-to-noise ratio exceeds a certain minimum value. In a sophisticated system the acquisition circuit will upon a loss of signal substitute a programmed signal to the elevation and train servos in an attempt to recover the signal. However, the acquisition circuit is not part of the invention and it has therefore not been described in detail since the frequency tracker portion of the disclosed system operates independently of the said circuit.

The signal-to-noise ratio utilized to operate the acquisition circuit is determined in each of the channels by a signal-to-noise detector 160 which samples the noise signal from selector switch 117 and a signal-plus-noise sample from a 200 c.p.s. filter 162 connected to the output of low pass filter 114. Each of the channels is identical, therefore only one of the signal-to-noise detectors is shown and the other is included in lower channel 113.

What is claimed is:

1. A frequency tracker suitable for use in a paired dual multiple beam Doppler radio navigation system comprising, a variable oscillator for supplying two frequencies equally spaced above and below a base reference frequency, said spacing being proportional to an error voltage, and a third frequency equal to one-half the frequency difference of said two frequencies equally spaced above and below the said base frequency, identical upper and lower signal processing channels each of which include, a mixer for receiving and mixing a Doppler shifted reference frequency superposed on broadband noise and in each of said mixers a different one of the equally spaced frequencies supplied by the above said oscillator, first means including a variable filter responsive to the third frequency from said oscillator for providing a narrow band output about a point determined by the said third frequency from said oscillator, and second means responsive to the narrow band output from the first means in each of said channels for deriving an error signal, and third means for processing the upper and lower channel error signals to derive error signals for indicating instantaneous changes in the system flight parameters.

2. A frequency tracker as set forth in claim 1 in which said first means includes in addition to said frequency controlled variable low pass filter a frequency filtering means for separating the output from the mixer into two signals, one of said signals containing noise only and the other the converted Doppler shifted signal superposed on noise, attenuating means responsive to the said third frequency from the oscillator for attenuating the noise signal only as a function of said frequency, means for applying the noise-plus-signal output from the frequency filtering means to the said frequency controlled variable low pass filter responsive to the third frequency from the oscillator, and means for recombining the attenuated noise and the output of the said frequency controlled variable low pass filter to secure a narrow band output about a point determined by the said third frequency from the oscillator.

3. A frequency tracker suitable for use in a paired dual multiple beam Doppler radio navigation system comprising, a variable oscillator for supplying two frequencies equally spaced above and below a base reference frequency, said spacing being proportional to an error voltage, and a third frequency equal to one-half the frequency difference of said two frequencies equally spaced above and below the said base frequency, identical upper and lower signal processing channels each of which include, a mixer for receiving and mixing a Doppler shifted reference frequency superposed on broadband noise and in each of said mixers a different one of the equally spaced frequencies supplied by the above said oscillator, first means including a variable filter responsive to the third frequency from said oscillator for providing a narrow band output about a point determined by the said third frequency from said oscillator, and second means responsive to the narrow band output from the first means in each of said channels for deriving an error signal, third means for subtracting the upper and lower channel error signals to derive a single composite error signal for indicating the deviation of the third frequency from the system velocity, and fourth means for converting and applying the output of said subtracting means to the said oscillator whereby the spacing of the frequencies above and below the said reference frequency is adjusted to correspond to the system velocity to null the error signal from the said subtracting means.

4. A frequency tracker as set forth in claim 3 in which said first means includes in addition to said frequency controlled variable low pass filter a frequency filtering means for separating the output from the mixer into two signals, one of said signals containing noise only and the other the converted Doppler shifted signal superposed on noise, attenuating means responsive to the said third frequency from the oscillator for attenuating the noise signal only as a function of said frequency, means for applying the noise-plus-signal output from the frequency filtering means to the said frequency controlled variable low pass filter responsive to the third frequency from the oscillator, and means for recombining the attenuated noise and the output of the said frequency controlled variable low pass filter to secure a narrow band output about a point determined by the said third frequency from the oscillator.

5. A frequency tracker suitable for use in a paired dual multiple beam Doppler radio navigation system comprising, a variable oscillator for supplying two frequencies equally spaced above and below a base reference frequency, said spacing being proportional to an error voltage, and a third frequency equal to one-half the frequency difference of said two frequencies equally spaced above and below the said base frequency, identical upper and lower signal processing channels each of which include, a mixer for receiving and mixing a Doppler shifted reference frequency superposed on broadband noise and in each of said mixers a different one of the equally spaced frequencies supplied by the above said oscillator, first means including a variable filter responsive to the third frequency from said oscillator for providing a narrow band output about a point determined by the said third frequency from said oscillator, and second means responsive to the narrow band output from the first means in each of said channels for deriving an error signal, third means for adding the upper and lower channel error signals to derive a single composite error signal for indicating the physical deviation of the system from its actual velocity vector in train and elevation, and fourth means for converting the said composite error signal from said adding means to a pair of error signals for indicating the physical deviation of systems in train and elevation, respectively, from the said system velocity vector.

6. A frequency tracker as set forth in claim 5 in which said first means includes in addition to said frequency controlled variable low pass filter a frequency filtering means for separating the output from the mixer into two signals, one of said signals containing noise only and the other the converted Doppler shifted signal superposed on noise, attenuating means responsive to the said third frequency from the oscillator for attenuating the noise signal only as a function of said frequency, means for applying the noise-plus-signal output from the frequency filtering means to the said frequency controlled variable low pass filter responsive to the third frequency from the oscillator.

and means for recombining the attenuated noise and the output of the said frequency controlled variable low pass filter to secure a narrow band output about a point determined by the said third frequency from the oscillator.

7. A frequency tracker suitable for use in a paired dual multiple beam Doppler radio navigation system comprising, a variable oscillator for supplying two frequencies equally spaced above and below a base reference frequency, said spacing being proportional to an error voltage, and a third frequency equal to one-half the frequency difference of said two frequencies equally spaced above and below the said base frequency, identical upper and lower signal processing channels each of which include, a mixer for receiving and mixing a Doppler shifted reference frequency superposed on broadband noise and in each of said mixers a different one of the equally spaced frequencies supplied by the above said oscillator, first means including a variable filter responsive to the third frequency from said oscillator for providing a narrow band output about a point determined by the said third frequency from said oscillator, and second means responsive to the narrow band output from the first means in each of said channels for deriving an error signal, third means for subtracting the upper and lower channel error signals to derive a single composite error signal for indicating the deviation of the said third frequency from the system velocity, fourth means for converting and applying the output of said subtracting means to the said oscillator whereby the spacing of the frequencies above and below the said reference frequency is adjusted to correspond to the system velocity to null the error signal from the said subtracting means, fifth means for adding the upper and lower channel error signals to derive a single composite error signal for indicating the physical deviation of the system from its actual velocity vector in train and elevation, and sixth means for converting the said composite error signal from said adding means to a pair of error signals for indicating the physical deviation of the system in train and elevation, respectively, from the said system velocity vector.

8. A frequency tracker as set forth in claim 7 in which said first means includes in addition to said frequency controlled variable low pass filter a frequency filtering means for separating the output from the mixer into two signals, one of said signals containing noise only and the other the converted Doppler shifted signal superposed on noise, attenuating means responsive to the said third frequency from the oscillator for attenuating the noise signal only as a function of said frequency, means for applying the noise-plus-signal output from the frequency filtering means to the said frequency controlled variable low pass filter responsive to the third frequency from the oscillator, and means for recombining the attenuated noise and the output of the said frequency controlled variable low pass filter to secure a narrow band output about a point determined by the said third frequency from the oscillator.

9. A frequency tracker suitable for use in a paired dual multiple beam Doppler radio navigation system comprising, a variable oscillator for supplying two frequencies equally spaced above and below a base reference frequency, said spacing being proportional to an error voltage, and a third frequency equal to one-half the frequency difference of said two frequencies equally spaced above and below the said base frequency, a servo mechanism responsive to said third frequency output of said oscillator for providing a controlled displacement proportional to the frequency received, identical upper and lower signal processing channels each of which include, a mixer for receiving and mixing a Doppler shifted reference frequency superposed on broadband noise and in each of said mixers a different one of the said equally spaced frequencies supplied by the above said oscillator, first filter means connected to said mixer and controlled by the said servo mechanism for passing only a narrow band of Doppler shifted signal plus noise located about a frequency determined by the displacement provided by the said servo mechanism, second filter means connected to said mixer and controlled by the said servo mechanism for passing noise only having a power density corresponding to the displacement provided by the servo mechanism, means for combining the outputs from said first and second filter means and for deriving an error signal, and third means for processing the upper and lower channel error signals to derive error signals for indicating instantaneous changes in the system flight parameters.

10. A frequency tracker suitable for use in a paired dual multiple beam Doppler radio navigation system comprising, a variable oscillator for supplying two frequencies equally spaced above and below a base reference frequency, said spacing being proportional to an error voltage, and a third frequency equal to one-half the frequency difference of said two frequencies equally spaced above and below the said base frequency, a servo mechanism responsive to said third frequency output of said oscillator for providing a controlled displacement proportional to the frequency received, identical upper and lower signal processing channels each of which include, a mixer for receiving and mixing a Doppler shifted reference frequency superposed on broadband noise and in each of said mixers a different one of the equally spaced frequencies supplied by the above said oscillator, first filter means connected to said mixer and controlled by the said servo mechanism for passing only a narrow band of Doppler shifted signal plus noise located about a frequency determined by the displacement provided by the said servo mechanism, second filter means connected to said mixer and controlled by the said servo mechanism for passing noise only having a power density corresponding to the displacement provided by the servo mechanism, means for combining the outputs from said first and second filter means and for deriving an error signal, second means for subtracting the upper and lower channel error signals to derive a single composite error signal for indicating the deviation of the said third frequency from the system velocity, and third means for converting and applying the output of said subtracting means to the said oscillator whereby the spacing of the frequencies above and below the said reference frequency is adjusted to correspond to the system velocity to null the error signal from the said subtracting means.

11. A frequency tracker suitable for use in a paired dual multiple beam Doppler radio navigation system comprising, a variable oscillator for supplying two frequencies equally spaced above and below a base reference frequency, said spacing being proportional to an error voltage, and a third frequency equal to one-half the frequency difference of said two frequencies equally spaced above and below the said base frequency, a servo mechanism responsive to said third frequency output of said oscillator for providing a controlled displacement proportional to the frequency received, identical upper and lower signal processing channels each of which include, a mixer for receiving and mixing a Doppler shifted reference frequency superposed on broadband noise and in each of said mixers a different one of the equally spaced frequencies supplied by the above said oscillator, first filter means connected to said mixer and controlled by the said servo mechanism for passing only a narrow band of Doppler shifted signal plus noise located about a frequency determined by the displacement provided by the said servo mechanism, second filter means connected to said mixer and controlled by the said servo mechanism for passing noise only having a power density corresponding to the displacement provided by the servo mechanism, means for combining the outputs from said first and second filter means and for deriving an error signal, second means for adding the upper and lower channel error signals to derive a single composite error signal for indicating the physical deviation of the system from its actual velocity vector, and third means for converting the said composite error signal from said adding means to a pair of error signals for indicating the physical deviation of system in train and elevation, respectively, from the said system velocity vector.

12. A frequency tracker suitable for use in a paired dual multiple beam Doppler radio navigation system comprising, a variable oscillator for supplying two frequencies equally spaced above and below a base reference frequency, said spacing being proportional to an error voltage, and a third frequency equal to one-half the frequency difference of said two frequencies equally spaced above and below the said base frequency, a servo mechanism responsive to said third frequency output of said oscillator for providing a controlled displacement proportional to the frequency received, identical upper and lower signal processing channels each of which include, a mixer for receiving and mixing a Doppler shifted reference frequency superposed on broadband noise and in each of said mixers a different one of the equally spaced frequencies supplied by the above said oscillator, first filter means connected to said mixer and controlled by the said servo mechanism for passing only a narrow band of Doppler shifted signal plus noise located about a frequency determined by the displacement provided by the said servo mechanism, second filter means connected to said mixer and controlled by the said servo mechanism for passing noise only having a power density corresponding to the displacement provided by the servo mechanism, means for combining the outputs from said first and second filter means and for deriving an error signal, second means for subtracting the upper and lower channel error signals to derive a single composite error signal for indicating the deviation of the said third frequency from the system velocity, third means for converting and applying the output of said subtracting means to the said oscillator whereby the spacing of the frequencies above and below the said reference frequency is adjusted to correspond to the system velocity to null the error signal from the said subtracting means, fourth means for adding the upper and lower channel error signals to derive a single composite error signal for indicating the physical deviation of the system from its actual velocity vector, and fifth means for converting the said composite error signal from said adding means to a pair of error signals for indicating the physical deviation of the system in train and elevation, respectively, from the said system velocity vector.

No references cited.